United States Patent
Ennis

(10) Patent No.: US 7,331,079 B2
(45) Date of Patent: Feb. 19, 2008

(54) LIQUID LUBRICATED CLEANING ELEMENT FOR VEHICLE WASHING APPARATUS

(76) Inventor: G. Thomas Ennis, 235 W. Florence Ave., Inglewood, CA (US) 90301

( * ) Notice: Subject to any disclaimer, the term of this patent is extended or adjusted under 35 U.S.C. 154(b) by 582 days.

(21) Appl. No.: 10/920,406

(22) Filed: Aug. 18, 2004

(65) Prior Publication Data

US 2006/0037633 A1   Feb. 23, 2006

(51) Int. Cl.
*B60S 3/04* (2006.01)
(52) U.S. Cl. .................................... 15/97.3; 15/DIG. 2
(58) Field of Classification Search ................. 15/97.1, 15/97.3, DIG. 2; 134/123
See application file for complete search history.

(56) References Cited

U.S. PATENT DOCUMENTS

| | | |
|---|---|---|
| 3,548,437 A | 12/1970 | Anderson |
| 4,161,801 A | 7/1979 | Day et al. |
| 4,285,736 A | 8/1981 | Arato |
| 4,288,255 A | 9/1981 | Burger |
| 4,567,620 A | 2/1986 | Hanna |
| 4,784,078 A | 11/1988 | Feurt |
| 4,852,199 A | 8/1989 | Holbus |
| 5,077,859 A | 1/1992 | Ennis |
| 5,098,023 A * | 3/1992 | Burke ..................... 239/273 |

* cited by examiner

*Primary Examiner*—Laura Guidotti
(74) *Attorney, Agent, or Firm*—Mattingly, Stanger, Malur & Brundidge, P.C.

(57) ABSTRACT

A vehicle washing apparatus includes a curtain cleaning element constructed of a main pipe for receiving a liquid from a supply source and having a plurality of openings therein and a plurality of secondary pipes connected to the openings in the main pipe for receiving the liquid therefrom and discharging it through a plurality of discharge openings. The main pipe and the secondary pipes form a framework for supporting a curtain constructed of a liquid retaining material folded over on itself to form a double layer of the material fastened together at spaced positions, with the secondary pipes positioned between the layers whereby when liquid is flowed through the pipes, it is discharged through the discharge openings to wet or lubricate the liquid retaining material of the cleaning element. The vehicle washing apparatus includes a frame having a set of top mounted curtains and two sets of opposed side curtains rotatably attached thereto for washing a vehicle.

13 Claims, 6 Drawing Sheets

LIQUID LUBRICATED CLEANING ELEMENT FOR VEHICLE WASHING APPARATUS

BACKGROUND OF THE INVENTION

1. Field of the Invention

The present invention relates to an improved cleaning element for a vehicle washing apparatus and, more particularly, to such a cleaning element which is lubricated by a liquid from the inside thereof.

2. Description of the Related Art

Many different kinds of devices are known in the art for washing vehicles, such as rotating brush assemblies, cleaning curtains and/or other cleaning elements.

A common problem associated with various types of automatic vehicle washing devices is that abrading occurs to the surface of a vehicle during a scrubbing operation. This is particularly true in the case of washing curtains which contact the top, sides and other surfaces of a vehicle. These curtains are usually made of synthetic material which is relatively stiff such a woven or felted fabric having virtually no pile. The rubbing action of these curtains against the surfaces of a vehicle as relative movement occurs between the curtains and the vehicle can cause abrading, scratching and other damage to the surfaces of the vehicle. One way to lessen any such damage is to make certain that a sufficient amount of liquid is applied to the curtains to lubricate or wet the surfaces thereof as scrubbing of the vehicles takes place. Accordingly, there is a need in the vehicle washing field for a curtain cleaning element which is sufficiently lubricated to clean the surface of a vehicle without causing any undue damage to the surfaces of the vehicle.

SUMMARY OF THE INVENTION

It is an object of the present invention to provide a cleaning element for a vehicle washing apparatus which is of a suitable material and construction to be sufficiently lubricated or wetted so as to avoid damaging the surface of a vehicle during a washing operation.

A further object of the invention is to provide a cleaning element for a vehicle washing apparatus having a frame constructed of a plurality of perforated pipes which supply a liquid to the interior of the cleaning element.

Another object of the invention is to provide a cleaning element for a vehicle washing apparatus which includes a curtain constructed of a deep pile, fur-like material which substantially avoids any damage to the surface of a vehicle, particularly when the material is lubricated or wetted by a liquid.

A still further object of the invention is to provide a vehicle washing apparatus having a plurality of sets of cleaning elements for cleaning the surfaces of a vehicle.

The present invention achieves the above and other objects by providing a cleaning element for a vehicle washing apparatus wherein the cleaning element is constructed of a main pipe for receiving a liquid from a supply source with the main pipe having a plurality openings therein. Connecting means are attached to the main pipe for connecting the main pipe to a frame of the vehicle washing apparatus. A plurality of secondary pipes are connected to the openings in the main pipe for receiving liquid therefrom and the secondary pipes each have a plurality of discharge openings therein. The main pipe and the secondary pipes form a framework for supporting a curtain constructed of a liquid retaining material folded over on itself to form a double layer of the material fastened together at spaced positions to form pockets in which the secondary pipes are positioned so that when liquid is flowed through the main pipe and the secondary pipes, the liquid is discharged through the discharge openings to lubricate or wet the liquid retaining material of the cleaning element from the inside thereof. The cleaning element further includes a swivel connector to pivotally connect the cleaning element to the frame of the vehicle washing apparatus with the swivel connector being biased to a starting position by suitable means such as a torsion spring.

The present invention further includes a vehicle washing apparatus having a frame extending overhead of the path of a vehicle to be washed and being provided with a first set of cleaning elements mounted to the frame at a position overhead of the path, a second set of cleaning elements mounted to the frame on one side of the path and a third set of cleaning elements mounted to the frame at an opposite side of the path. Each of the sets of cleaning elements includes a plurality of blanket-like or curtain cleaning elements spaced in succession, one behind another, which each succeeding cleaning element after a first cleaning element being of a greater length than the cleaning element in front of it.

These and other features and advantages of the present invention will become more apparent with reference to the following detailed description of drawings.

DETAIL DESCRIPTION OF THE PREFERRED EMBODIMENTS

Figure 1:
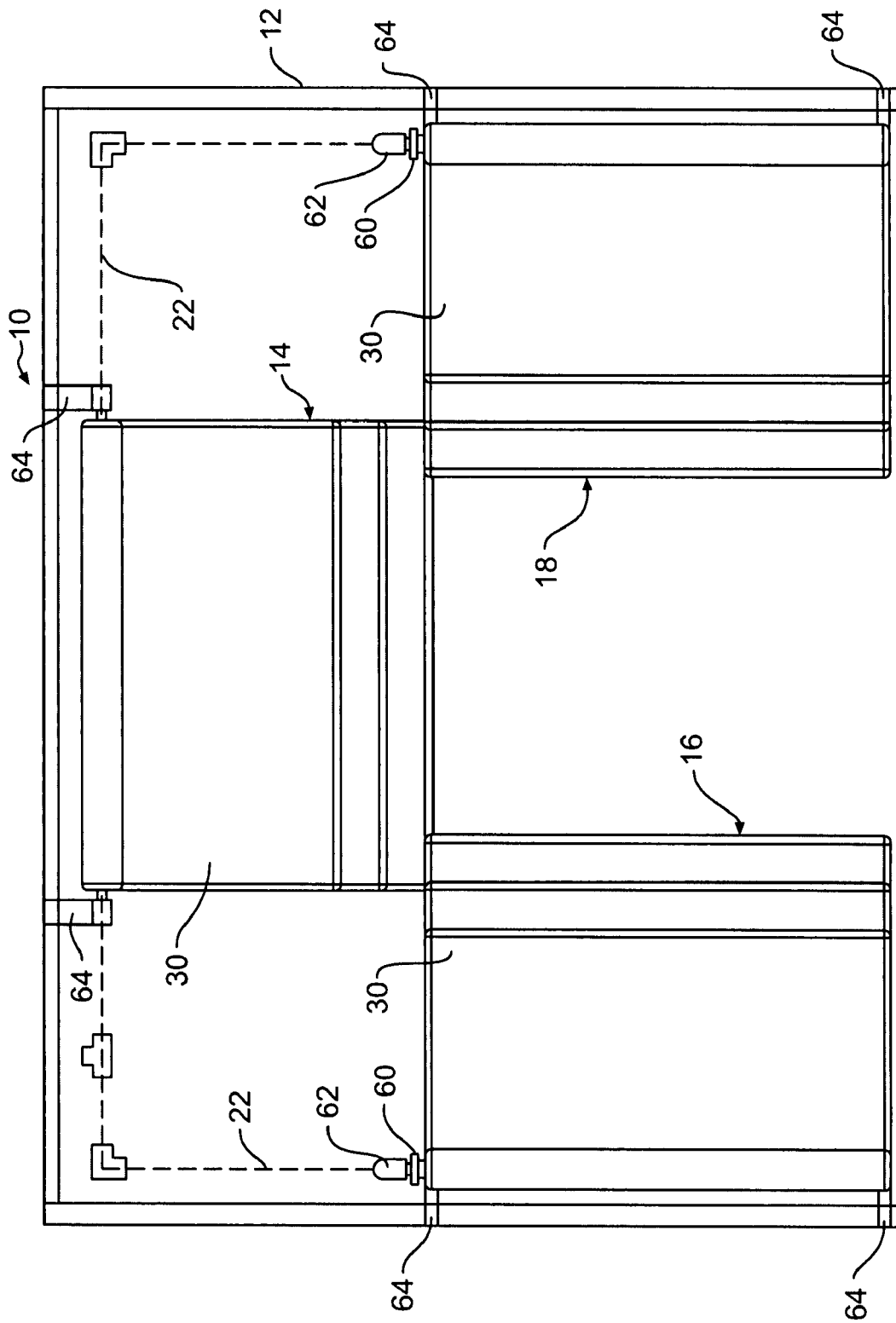
FIG. 1 is a front elevational view of a vehicle washing apparatus employing a plurality of sets of curtain cleaning elements constructed according to the present invention.

Referring to the drawings and, in particular, FIG. 1, a vehicle washing apparatus, generally referred to by the numeral 10, includes a supporting frame 12 extending overhead of the path of a vehicle to be washed. A first set 14 of curtain cleaning elements is mounted centrally to the top of the frame, a second set 16 of curtain cleaning elements is mounted to one side of the frame and a third set 18 of curtain cleaning elements is mounted to an opposite side of the frame of the vehicle washing apparatus. As will be discussed in greater detail hereafter, each of the curtain cleaning elements 30 is pivotally mounted to the frame so that the elements pivot in the direction of a vehicle moving through the vehicle washing apparatus.

Figure 2:
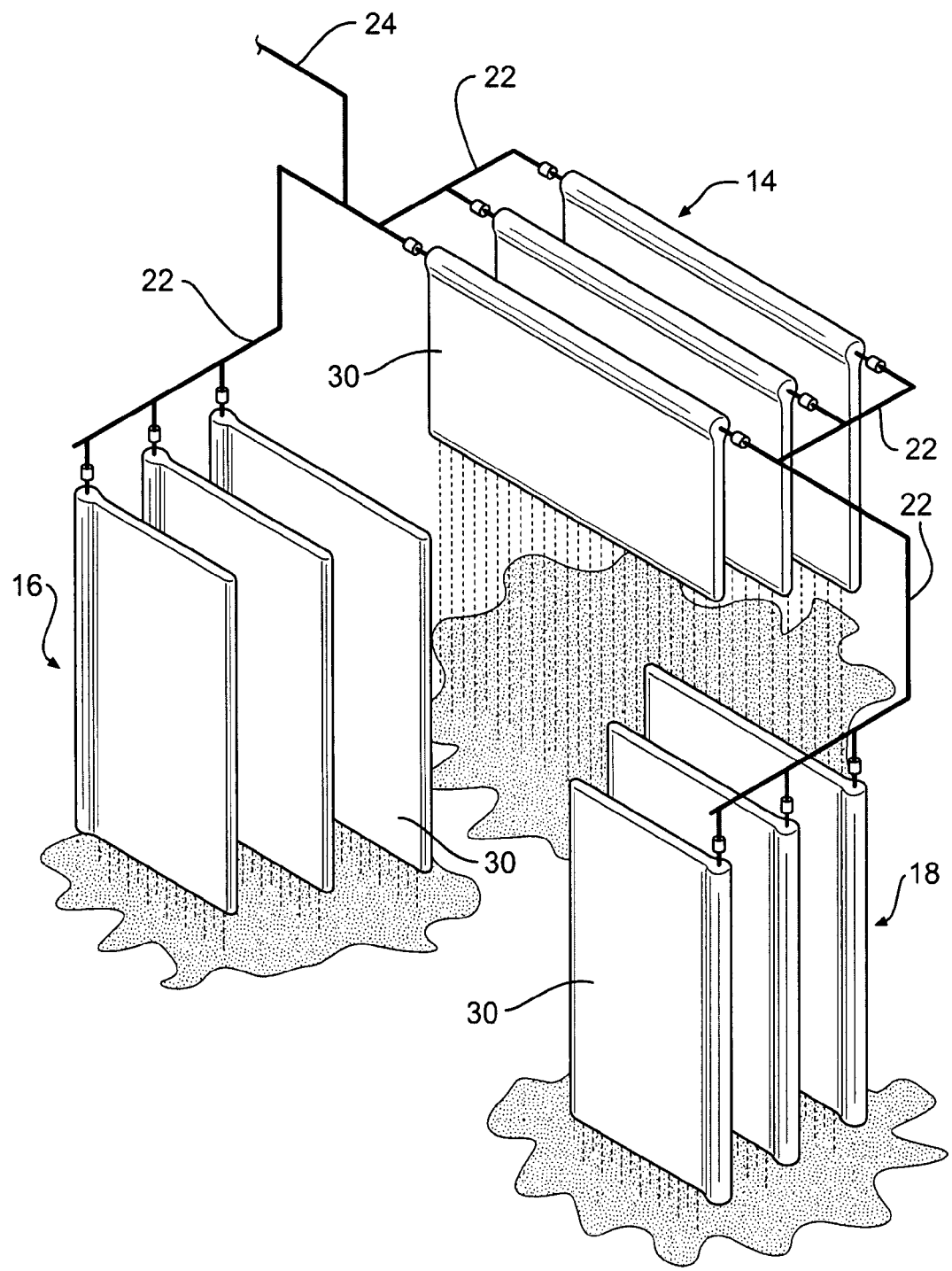
FIG. 2 is a perspective view showing the arrangement of the curtain cleaning elements and the piping which supplies liquid to each of the curtain cleaning elements.

As shown in FIG. 2, a plurality of connected distributing pipes 22 are provided for distributing a liquid from a liquid supply source 24 to each of the cleaning elements 30. The distributing pipes 22 are connected together to form a network of the pipes. The liquid may be water and/or soap or other cleaning or treating solutions.

Figure 5:
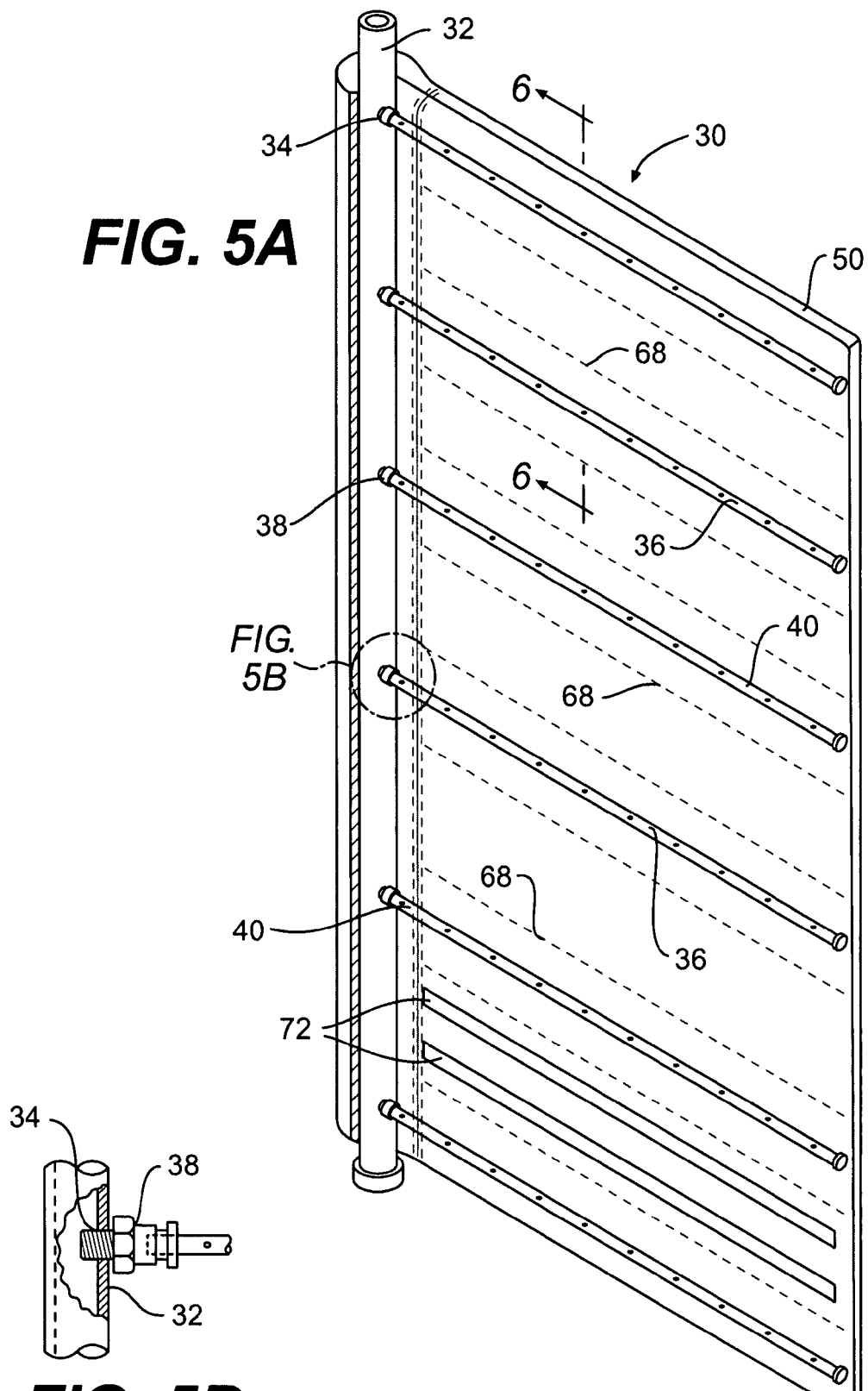
FIG. 5A is a perspective view, partially broken away, of a cleaning element showing the inside construction of the cleaning element.
FIG. 5B is an enlarged view of a connection of a secondary pipe to a main pipe taken from a portion of FIG. 5A.

Referring to FIG. 5A, each curtain cleaning element 30 is comprised of a main pipe 32 having a plurality of openings 34 spaced along its length thereof. At least the vertical curtains of curtain sets 16 and 18 are capped at one end. A secondary pipe 36 is connected at one end to each of the openings 34 as shown in FIG. 5B. The connector 38 for each secondary pipe and opening may have a threaded end and may be tightened to the main pipe by suitable means such as a nut. Each connector 38 has a hollow interior whereby liquid from a main pipe 32 is transferred to a secondary pipe 36. Each secondary pipe 36 has a plurality of discharge openings 40 spaced along its length thereof to discharge a liquid to the interior of the cleaning element.

As shown in FIG. 5A, a main pipe 32, the connectors 38 and the secondary pipes 36, when assembled, form a framework for receiving and supporting a cleaning curtain 50.

Figures 6, 7:
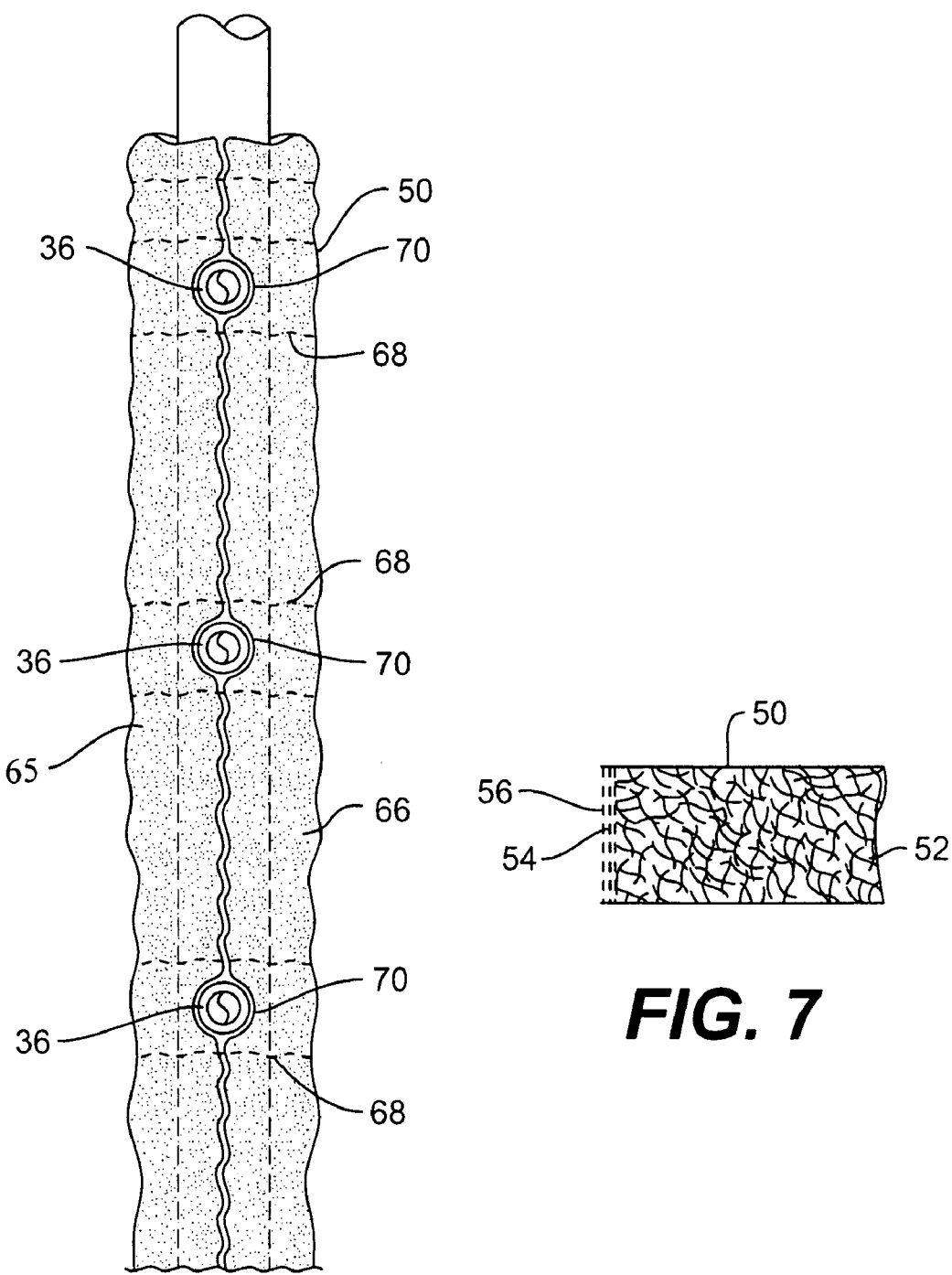
FIG. 6 is a sectional view taking along line 6-6 of FIG. 5A showing how the material of the cleaning element is folded over on itself and stitched together to form pockets in which secondary pipes are positioned.
FIG. 7 is an enlarged cross-sectional view of a piece of material used in making the curtain of a cleaning element of the present invention.

Each cleaning curtain 50 is comprised of a blanket of material folded over on itself as shown in FIGS. 5A and 6. The material of which each curtain is formed preferably is a deep pile, tufted (randomly oriented) monofilament fibrous material manufactured by Borg Fabrics of New York. The fabric is of a deep pile material which has a fur-like appearance. The deep file, fur-like material preferably has a thickness or depth from one-fourth of an inch to one inch. The fibers of the material preferably are 85 percent polyester and 15 percent acrylic. A small section of this material is illustrated in FIG. 7 as a thick cluster of tufted monofilament fibers 52 upstanding from a woven base 54 which provides a fabric layer. The base 54 may be made of 100 percent polyester or other comparable materials. The woven base provides an elastic base or backing. A non-elastic backing 56 also may be applied to the base if desired. The backing 56 may be attached by stitching or by adhesive bonding or other suitable means to the base 42.

The curtain also may be constructed of other suitable materials such as regular cloth, felt or the like. A material with a pile deep enough to have liquid retaining qualities, however, is preferred.

As shown in FIG. 5A and FIG. 6, each cleaning curtain 50 is formed by folding the material over on itself to form a double layer of material supported by the framework of the main pipe 32 and the secondary pipes 36. The material is formed in double layers preferably by wrapping it around the main pipe 32 and then securing the outer edges together by any suitable means such as stitching or adhesive bonding. The connectors 38 form a rigid connection for connecting the secondary pipes 36 to the main pipe 32 so that a rigid framework of the pipes formed is sufficient to support the weight of the cleaning curtain 50 even when the cleaning curtain 50 is saturated with a liquid.

Referring to FIG. 1, each cleaning element 30 is provided with a swivel connection 60 on at least one end of the main pipe 32 to permit the cleaning element to rotate when it is contacted by a vehicle. Suitable means such as a torsion spring 62 are provided to bias each cleaning element to a normal or starting position. As also shown in FIG. 1, each cleaning element is connected to the frame by suitable means such as brackets 64.

When the cleaning material is folded over on itself, two separate layers 65 and 66 are formed, as shown in FIG. 6. The two layers are securely attached to one another by suitable means such as stitching. As shown in FIG. 6, the stitching 68 penetrates through both layers 65 and 66 of the cleaning curtain material to form pockets 70 in which the secondary pipes 36 are accommodated. The stitching keeps the cleaning curtain and the pipes in close relationship to one another.

Although the pipe framework provided by the main pipe 32 and secondary pipes 36 forms a solid framework for maintaining the cleaning curtain relatively stable, if desired, additional stiffening members 72 may be inserted between the layers of the curtain as shown in the lower portion of FIG. 5A.

Figure 3:
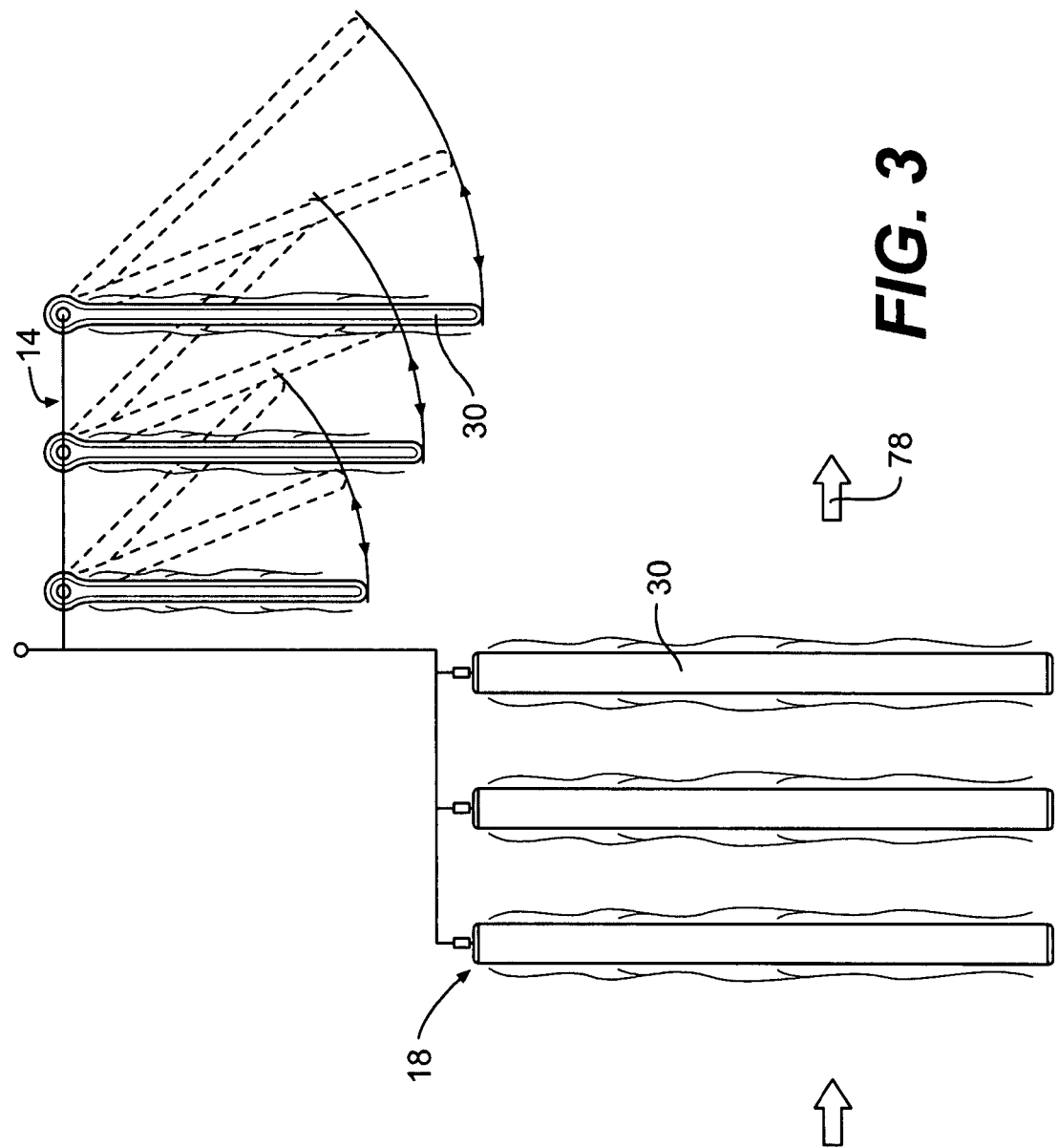
FIG. 3 is a side elevational view showing the manner in which an upper set of curtain cleaning elements pivots in the direction of a moving vehicle as the vehicle passes through the cleaning apparatus.
Figure 4:
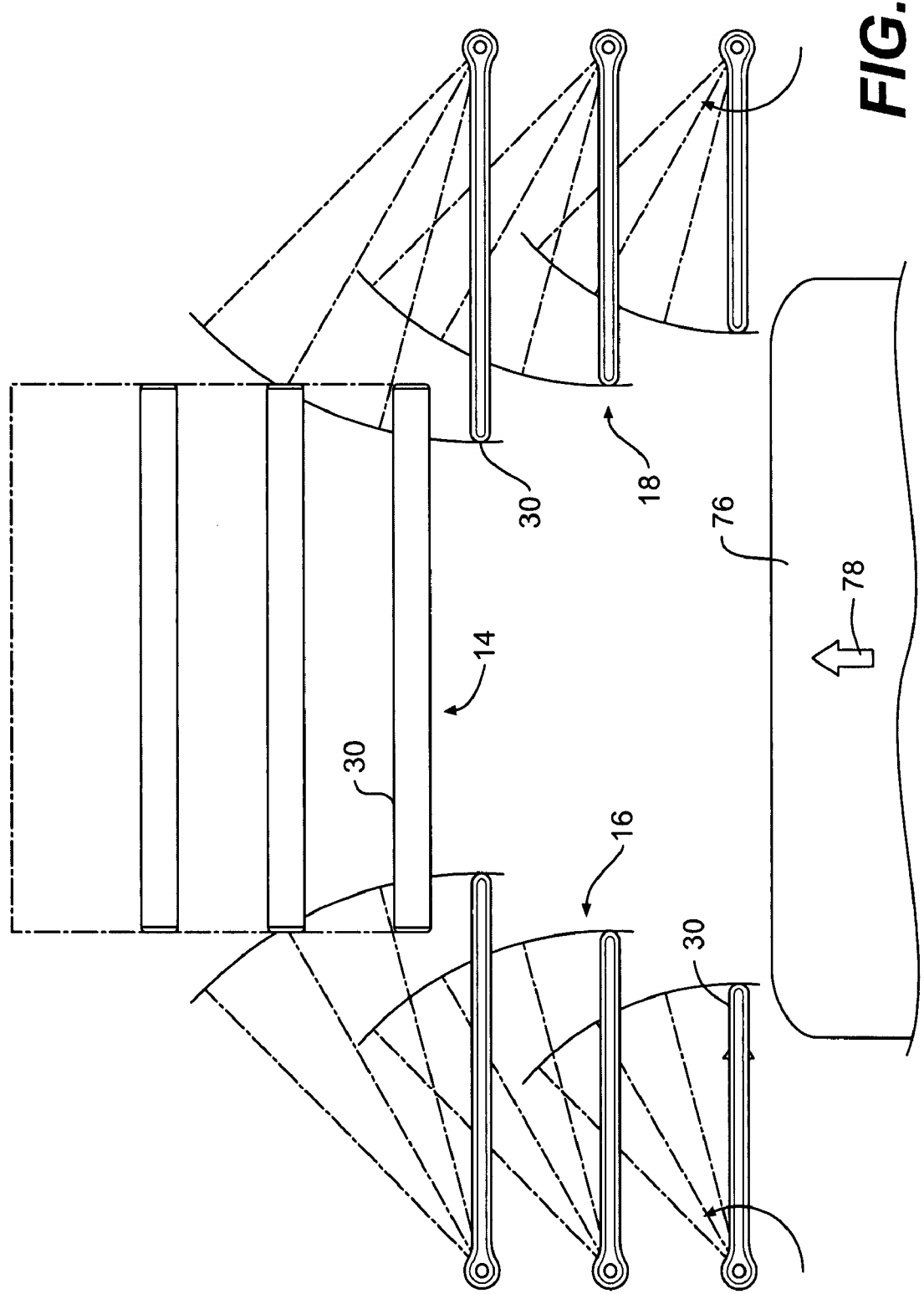
FIG. 4 is a top plan view showing the manner in which the side sets of curtain cleaning elements pivot in the direction of movement of a vehicle as the vehicle passes through a washing apparatus.

In operation of the vehicle cleaning apparatus of the present invention, the liquid supply is turned on and the liquid flows through the various pipes to wet or lubricate each of the cleaning elements 30. Typically, the cleaning elements are saturated with the liquid. As shown in FIG. 4, when a vehicle 76 traveling in the direction shown by the arrow 78 moves through and contacts the cleaning elements, each element is pushed by the vehicle and pivots backwardly in the direction of movement of the vehicle. The movement of each set of side cleaning elements is shown in FIG. 4 and the movement of the first set of cleaning elements mounted overhead on the frame is shown in FIG. 3. The swivel connections of the cleaning elements permit them to easily pivot backwardly in the direction of movement of the vehicle. The use of spring means such as torsion spring 62 biases each cleaning element towards its normal starting position so that after a vehicle has passed the cleaning element, it rotates forwardly back to its starting position where it is ready for another washing operation.

Applicant's invention provides an apparatus and method of cleaning a vehicle by which the cleaning action is gentle and does not tend to scratch or otherwise mar the surface of the vehicle. The combination of the deep pile, fur-like material used in the cleaning curtain and the pipe framework for supplying liquid to each curtain is very effective in that the deep pile material is able to retain a significant amount of liquid, which then enables the cleaning curtain to slowly and easily pass over the surface of the vehicle while still effecting an adequate cleaning action. The cleaning action is caused by friction contact between the material of the cleaning curtain and the surfaces of a vehicle in combination with a sufficient supply of liquid to carry away dirt particles without damaging the surfaces of a vehicle. Moreover, the spring biasing means for each cleaning curtain, ensures that each curtain returns to its normal starting position after each washing operation whereby it is immediately ready for a further washing operation.

Numerous other modifications and adaptations of the present invention will be apparent to those skilled in the art, and thus, it is intended by the following claims, to cover all such modifications and adaptations which fall within the true spirit and scope of the invention.

I claim:

1. A cleaning element for a vehicle washing apparatus having a frame, said cleaning element comprising:
   a main pipe for receiving a liquid from a supply source, said main pipe having a plurality of openings therein;
   connecting means attached to said main pipe for connecting said main pipe to said frame;

a plurality of secondary pipes connected to said openings in said main pipe for receiving said liquid therefrom, said secondary pipes each having a plurality of discharge openings therein;

said main pipe and said secondary pipes forming a framework; and a curtain supported by said framework, said curtain being comprised of a liquid retaining material folded over on itself to form a double layer of said material fastened together at spaced positions to form pockets in which said secondary pipes are positioned whereby when said liquid is flowed through said main pipe and said secondary pipes, said liquid is discharged through said discharge openings to wet said liquid retaining material.

2. A cleaning element according to claim 1, wherein said connecting means comprises a swivel connector attached to said main pipe to pivotally connect said cleaning element to said frame.

3. A cleaning element according to claim 2, wherein said swivel connector includes spring means which biases said cleaning element to a starting position.

4. A cleaning element according to claim 3, wherein said spring means comprises a torsion spring.

5. A cleaning element according to claim 1, wherein said liquid retaining material comprises a deep pile, fur-like material.

6. A cleaning element according to claim 1, which further comprises stiffening members mounted in said curtain.

7. A vehicle washing apparatus comprising:

a frame extending overhead of a path of a vehicle to be washed;

a first set of cleaning elements mounted to said frame at a position overhead of said path;

a second set of cleaning elements mounted to said frame at one side of said path; and a third set of cleaning element mounted to said frame at an opposite side of said path;

a liquid supply source for supplying a liquid to said cleaning elements;

each of said cleaning elements comprising:

a main pipe for receiving a liquid from said liquid supply source, said main pipe having a plurality of openings therein;

connecting means attached to said main pipe for connecting said main pipe to said frame, a plurality of secondary pipes connected to said openings in said main pipe for receiving said liquid therefrom, said secondary pipes each having a plurality of discharge openings therein;

said main pipe and said secondary pipes forming a framework; and a curtain supported by said framework, said curtain being comprised of a liquid retaining material folded over on itself to form a double layer of said material fastened together at spaced positions to form pockets in which said secondary pipes are positioned whereby when said liquid is flowed through said main pipe and said secondary pipes, said liquid is discharged through said discharge openings to wet said liquid retaining material.

8. A vehicle washing apparatus according to claim 7, which further comprises a network of distributing pipes connected to said liquid supply source for distributing said liquid to each of said cleaning elements.

9. A vehicle washing apparatus according to claim 7, wherein each of said sets of cleaning elements includes a plurality of cleaning elements spaced in succession, one behind another, with each succeeding cleaning element after a first cleaning element being of greater length than a cleaning element in front of it.

10. A vehicle washing apparatus according to claim 7, wherein said connecting means comprises a swivel connector attached to said main pipe to pivotally connect said cleaning element to said frame.

11. A vehicle washing apparatus according to claim 10, wherein said swivel connector includes spring means which biases said cleaning element to a starting position.

12. A vehicle washing apparatus according to claim 11, wherein said spring means comprises a torsion spring.

13. A vehicle washing apparatus according to claim 7, wherein said liquid retaining material comprises a deep pile, fur-like material.

* * * * *